(12) United States Patent
Koperwas et al.

(10) Patent No.: US 10,846,920 B2
(45) Date of Patent: Nov. 24, 2020

(54) CREATING SHADOWS IN MIXED REALITY

(71) Applicant: Lucasfilm Entertainment Company Ltd. LLC, San Francisco, CA (US)

(72) Inventors: Michael Koperwas, San Francisco, CA (US); Lutz Latta, Mill Valley, CA (US)

(73) Assignee: LUCASFILM ENTERTAINMENT COMPANY LTD. LLC, San Francisco, CA (US)

( * ) Notice: Subject to any disclaimer, the term of this patent is extended or adjusted under 35 U.S.C. 154(b) by 0 days.

(21) Appl. No.: 16/281,003

(22) Filed: Feb. 20, 2019

(65) Prior Publication Data

US 2020/0265638 A1    Aug. 20, 2020

(51) Int. Cl.
| | |
|---|---|
| *G06T 15/60* | (2006.01) |
| *G06T 17/00* | (2006.01) |
| *G06T 7/11* | (2017.01) |
| *G06T 19/00* | (2011.01) |

(52) U.S. Cl.
CPC .............. *G06T 15/60* (2013.01); *G06T 7/11* (2017.01); *G06T 17/00* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2002/0093538 A1* | 7/2002 | Carlin | G06T 15/10 715/778 |
| 2019/0141291 A1* | 5/2019 | McNelley | H04N 5/272 |

OTHER PUBLICATIONS

O. Bimber and B. Frohlich, "Occlusion shadows: using projected light to generate realistic occlusion effects for view-dependent optical see-through displays," Proceedings. International Symposium on Mixed and Augmented Reality, Darmstadt, Germany, 2002, pp. 186-319. Oct. 2002. (Year: 2002).*

Cortes G, Marchand E, Brincin G and Lécuyer A, "MoSART: Mobile Spatial Augmented Reality for 3D Interaction With Tangible Objects". Front. Robot. AI 5:93. doi: 10.3389/frobt.2018.00093. Jan. 2003. (Year: 2003).*

* cited by examiner

*Primary Examiner* — Chong Wu
(74) *Attorney, Agent, or Firm* — Sheppard Mullin Richter & Hampton LLP

(57) ABSTRACT

Implementations of the disclosure are directed to generating shadows in the physical world that correspond to virtual objects displayed on MR displays. In some implementations, a method includes: synchronously presenting a version of a scene on each of a MR display system and a projector display system, where during presentation: the MR display system displays a virtual object overlaid over a view of a physical environment; and a projector of the projector display system creates a shadow on a surface in the physical environment, the created shadow corresponding to the virtual object displayed by the MR display. In some implementations, the method includes: loading in a memory of the MR display system, a first version of the scene including the virtual object; and loading in a memory of the projector display system a second version of the scene including a virtual surface onto which the virtual object casts a shadow.

17 Claims, 7 Drawing Sheets

CREATING SHADOWS IN MIXED REALITY

SUMMARY

Implementations of the disclosure are directed to using a light projection device in a physical environment (i.e., the real-world) to generate shadows corresponding to virtual objects displayed on mixed reality ("MR") display systems.

In one embodiment, a method includes: synchronously presenting a version of a scene on each of a mixed reality display system and a projector display system, where during presentation: the mixed reality display system displays a virtual object overlaid over a view of a physical environment; and a projector of the projector display system creates a shadow on a surface in the physical environment, the created shadow corresponding to the virtual object displayed by the mixed reality display system. Prior to presentation of the scene, virtual positions of the projector display system and the mixed reality display system in a virtual world may be aligned with actual positions of the projector display system and mixed reality display system in the physical environment.

In implementations, the method further includes: loading in a memory of the mixed reality display system, a first version of the scene, the first version of the scene including the virtual object; and loading in a memory of the projector display system, a second version of the scene, the second version of the scene including a virtual surface onto which the virtual object casts a shadow.

In implementations, synchronously presenting a version of the scene on each of the mixed reality display system and the projector display system, includes: synchronously initializing presentation of the scene loaded on each of the mixed reality display system and the projector display system.

In implementations, synchronously presenting a version of the scene on each of the mixed reality display system and the projector display system, includes: identifying an audio or hidden visual cue.

In implementations, creation of the shadow is based on the intensity and location of light sources in the physical environment.

In implementations, synchronously presenting a version of the scene on each of the mixed reality display system and the projector display system, includes: synchronously running an instance of a scene renderer on each of the projector display system and MR display system.

In implementations, the method further includes: creating the scene, where creating the scene includes creating a virtual environment corresponding to a three-dimensional representation of the physical environment.

In implementations, the projector is mounted above a head mounted display of the mixed reality display system, where at least a portion of the surface of the physical environment is the ground, where the head mounted display displays the virtual object overlaid over the real world environment.

In implementations, during presentation of the scene, the virtual object moves, where a position of the shadow created by the projector is shifted in accordance with the virtual object's movement.

In one embodiment, a system includes: a mixed reality display system including: a display configured to present a virtual object overlaid over a view of a physical environment; and a projector display system including: a projector configured to project an image on a surface in the physical environment, where the projected image includes a shadow corresponding to a shadow cast by the virtual object.

In implementations, the mixed reality display system further includes: a first memory including a first version of a scene, the first version of the scene including: the virtual object; and where the projector display system further includes: a second memory including a second version of the scene, the second version of the scene including a virtual surface corresponding to the surface in the physical environment.

The mixed reality display system and the projector display system may be configured to synchronously playback the first version of the scene and the second version of the scene. In some implementations, the display is a display of a head mounted display. In implementations, the mixed reality display system includes a position sensor to measure a position of the display during synchronous playback of the first version of the scene and the second version of the scene.

In one embodiment, a non-transitory computer readable medium has executable instructions stored thereon, that when executed by a processor, performs operations of: loading in a memory a scene, the loaded scene comprising a virtual surface onto which a virtual object casts a shadow; and causing a projector display system to present the loaded scene, wherein during presentation, a projector of the projector display system creates a shadow on a surface in a physical environment, the created shadow corresponding to the shadow cast by the virtual object in the scene.

In some implementations, the instructions, when executed by the processor, further perform an operation of: causing the projection display system to initialize presentation of the loaded scene in synchronization with a mixed reality display system initializing presentation of another version of the scene to display the virtual object overlaid over a view of the physical environment.

In some implementations, during presentation of the scene, the virtual object moves, where a position of the shadow created by the projector is shifted in accordance with the virtual object's movement.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the present disclosure to the precise form disclosed.

DETAILED DESCRIPTION

As used herein, the terms "mixed reality," "MR," "augmented reality," and "AR" generally refer to a view of a physical, real-world environment that is augmented or supplemented by computer-generated or digital information such as video, sound, and graphics. The digital information may be directly registered in the user's physical, real-world environment such that the user may interact with the digital information in real time or at interactive frame rates (e.g., 30, 60, 120, or 240 frames per second). The digital information may take the form of images, audio, haptic feedback, video, text, etc. For example, three-dimensional representations of virtual objects may be overlaid over the user's view of the real-world environment in real time.

With mixed reality applications becoming ubiquitous, there is an increasing need for mixed reality techniques that present a more realistic augmentation of the real-world. One way to improve the realism of virtual objects that are overlaid over a user's view of the real-world environment is to add a shadow to the virtual object. Some current techniques of creating shadows in MR applications rely on additive displays that use additive lighting techniques to add light to the light of the real-world environment while not adding light in areas where the object is supposed to cast a shadow. Such techniques, however, do not provide a way to darken the real world. The shadows of virtual objects are often not realistic or are displayed incorrectly, which detracts from the MR experience.

As such, there is a need to create more realistic shadows of virtual objects in MR experiences. To this end, various implementations of the disclosure are directed to improving the realism of virtual object shadows that are created for mixed reality. In particular, implementations described herein are directed to using a light projection device in the real-world to generate shadows corresponding to virtual objects displayed on MR display systems. As further described herein, the position of a MR display system (e.g., MR head mounted display (HMD)) worn by a user may be determined over time by a system. The system may obtain information regarding a physical location corresponding to a virtual object displayed using the MR display system. Using at least the real-world physical location corresponding to the virtual object, the system may cause the projection device to generate a shadow for the virtual object. By virtue of such implementations, a projector may be used to synchronously create shadows in the real world that add to the realism of virtual objects.

Figure 1A:
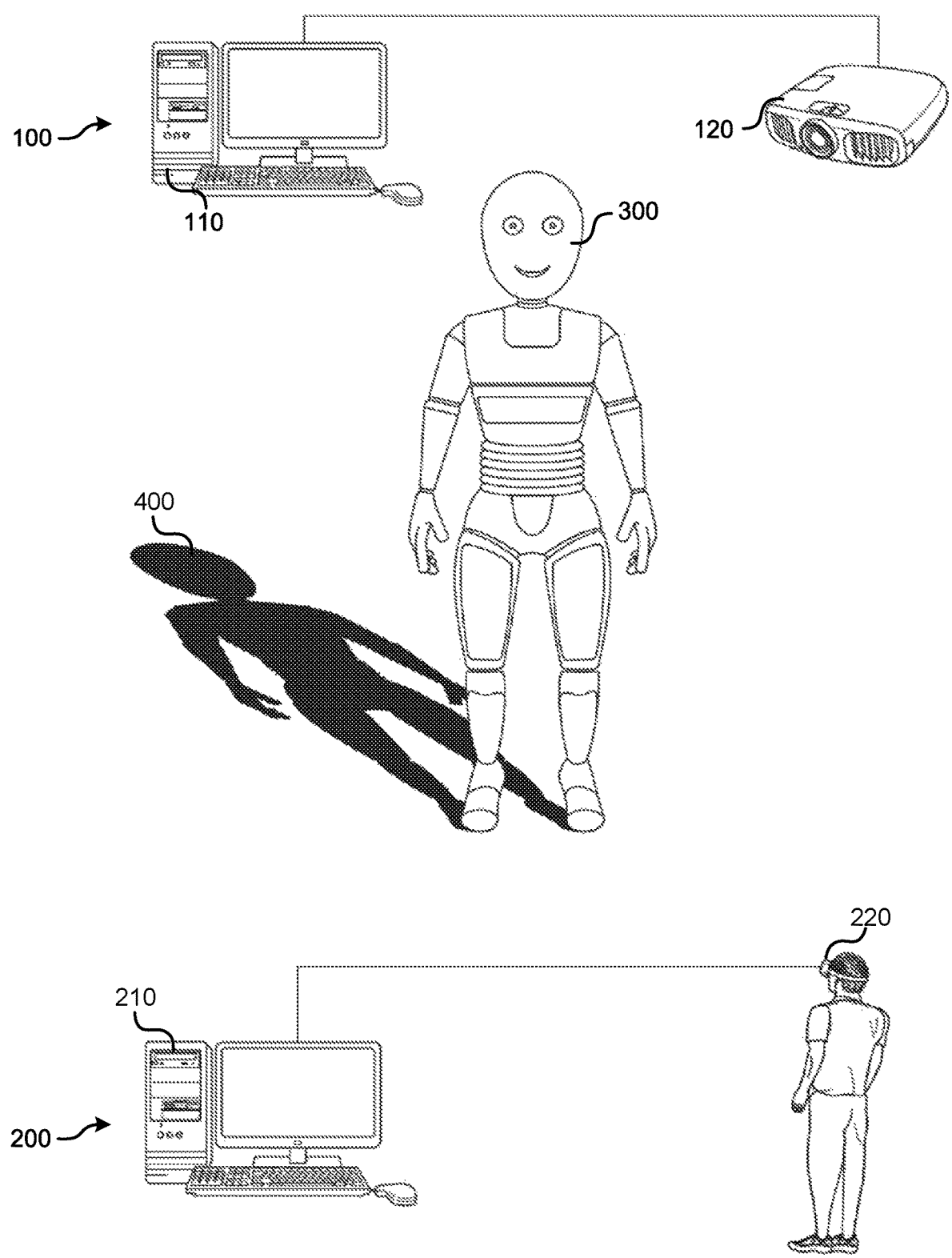
FIG. 1A illustrate an example environment in which embodiments of the disclosure may be implemented to provide a mixed reality experience, including projected shadows.

FIG. 1A illustrate an example environment in which embodiments of the disclosure may be implemented to provide a mixed reality experience, including projected shadows. The environment includes a projector display system 100 including a computing device 110 and projector 120, and a MR display system 200 including a computing device 210 and HMD 220. During presentation of a MR experience, MR display system 200 creates an MR view by overlaying a virtual object 300 over a view of the real-world environment. It should be noted that although in practice the virtual object 300 may only be visible to users of an MR display system (e.g., wearer of a HMD), the virtual object 300 is shown in FIG. 1A for simplicity of illustration. In the example of FIG. 1A, the MR view is presented through a HMD 220 that is tethered to computing device 210. However, in other implementations other MR displays devices may be used to present the MR view. For example, an untethered HMD, a smartphone, a tablet, a second projector, or some other device may be used to display a virtual object 300 that is overlaid over a view of the real-world environment.

Projector display system 100 uses projector 120 to synchronously project an image including a shadow 400 corresponding to the virtual object 300 that is presented through the HMD 250. In particular, projector 120 may be configured to control the shape and/or location of the shadow based on the shape and/or location of the virtual object. In implementations where the virtual object 300 moves relative to the real-world environment during the MR experience (e.g., the virtual object is a moving character), projection display system 200 may cause projector 120 to change the shape and/or location of the shadow 400 such that the shadow 400 remains in sync with the virtual object 300. In some implementations, as the user of the HMD 220 moves, the shape and/or location of the shadow may also be changed.

In implementations, the environment of FIG. 1A may be correspond to a location-based experience, indoors or outdoors, such as a theme park MR experience. Particular implementations may be implemented in environments where the provider of the MR experience has full control of the lighting in the real-world environment making the location appear as a normal, everyday scene illuminated by traditional lighting, even though all lights are under control and synchronized to the virtual object that augments the environment.

Figure 1B:
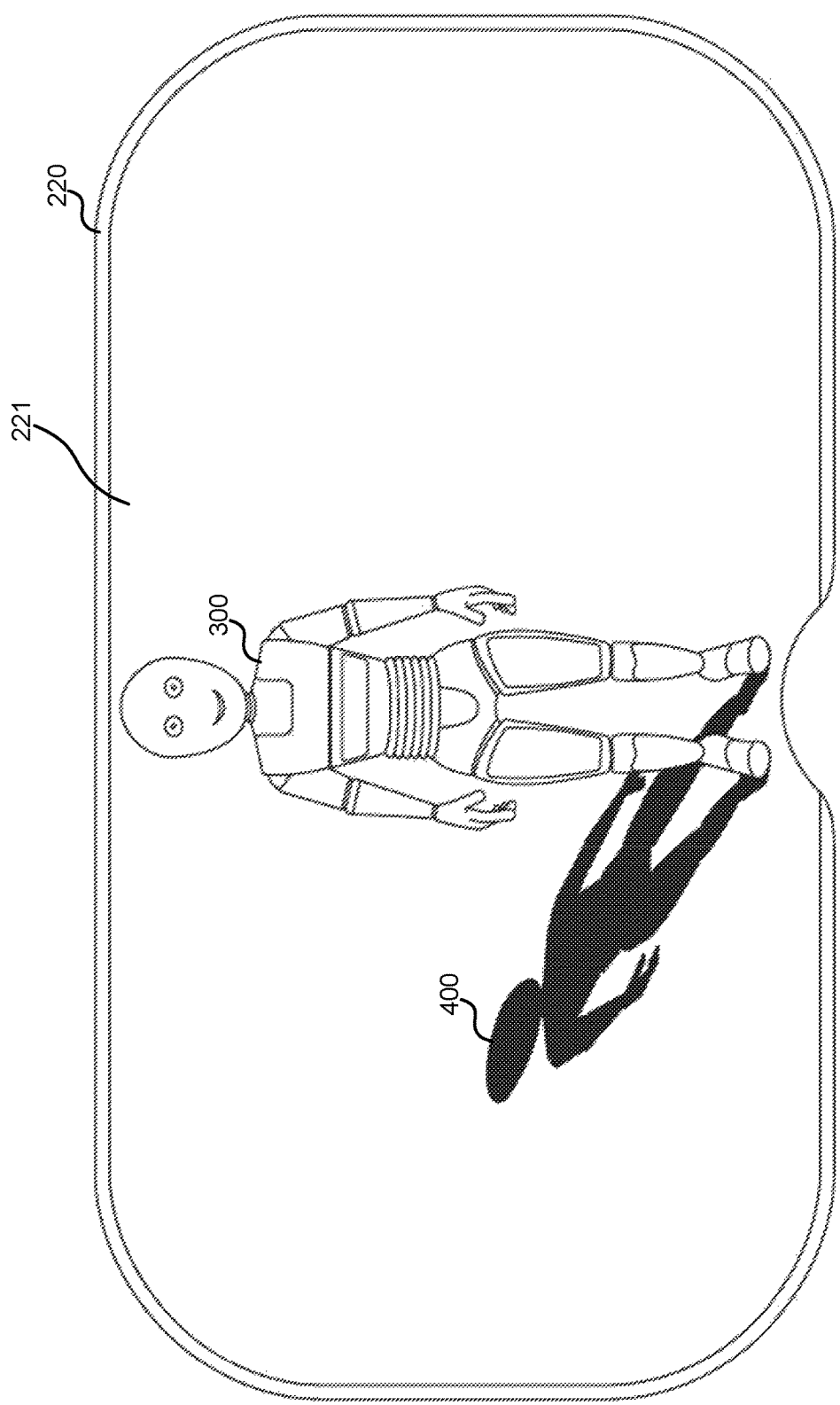
FIG. 1B illustrates a field of view of the HMD worn by the user of the environment of FIG. 1A.
Figure 1C:
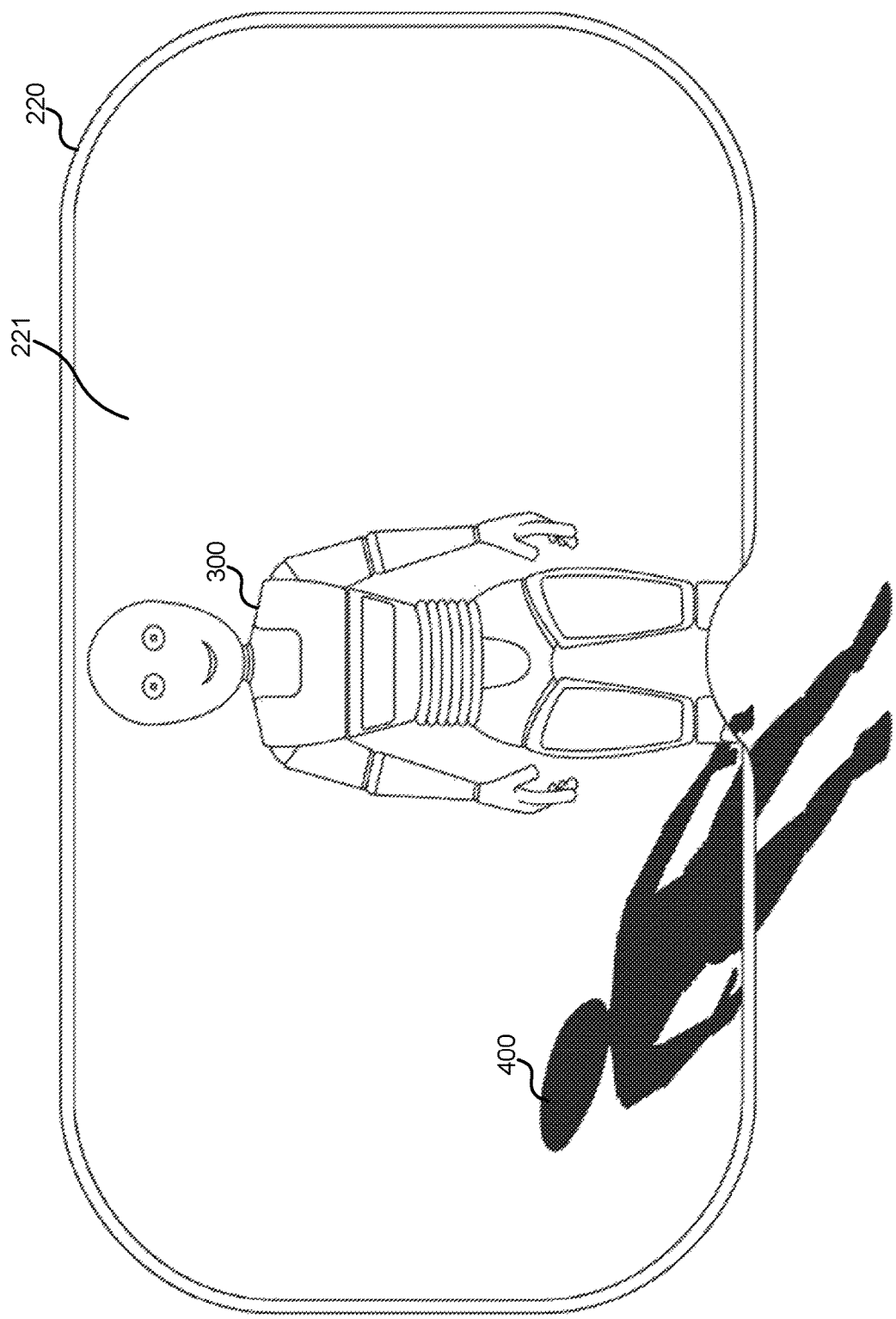
FIG. 1C illustrates the field of view of the HMD worn by the user of FIGS. 1A-1B after the user shifts their view in an upward direction.

FIG. 1B illustrates a field of view 221 of the HMD 220 worn by the user of the environment of FIG. 1A. Within field of view 221 of HMD 220, the overlaid virtual object 300 is visible along with the shadow 400 that is created in the real world environment using projector 120. FIG. 1C illustrates the field of view 221 of the HMD 220 worn by the user of FIGS. 1A-1B after the user shifts their view in an upward direction such that the legs of the overlaid virtual object are no longer within field of view 221. As shown, outside the field of view area 221, the virtual object 300 is invisible, but the shadow 400 created in the real world remains visible. Advantageously, even without the HMD 220 to display the virtual object 300, the relative positioning of the virtual object 300 may be observed from the created shadow 400. Additionally, depending on the environment in which the disclosure is implemented, the presence of a moving shadow 400 (even without an AR display system 200 to show a corresponding virtual object) may create an aesthetically pleasing effect.

It should be noted that although the example environment of FIG. 1A illustrates a single projector being used to create a single shadow corresponding to a single virtual object, in some implementations a single projector may be used to create multiple shadows for multiple virtual objects, and/or multiple projectors may be used to create multiple shadows for multiple virtual objects. For example, the lights of different projectors could be turned on and off, and the lighting effects could be adjusted to enhance the MR experience. Additionally, although a single user is illustrated in the example environment of FIG. 1A, in some instances multiple users (e.g., each user wearing a respective HMD) may simultaneously observe the virtual object 300 for which the projector(s) create a shadow.

Figure 2:
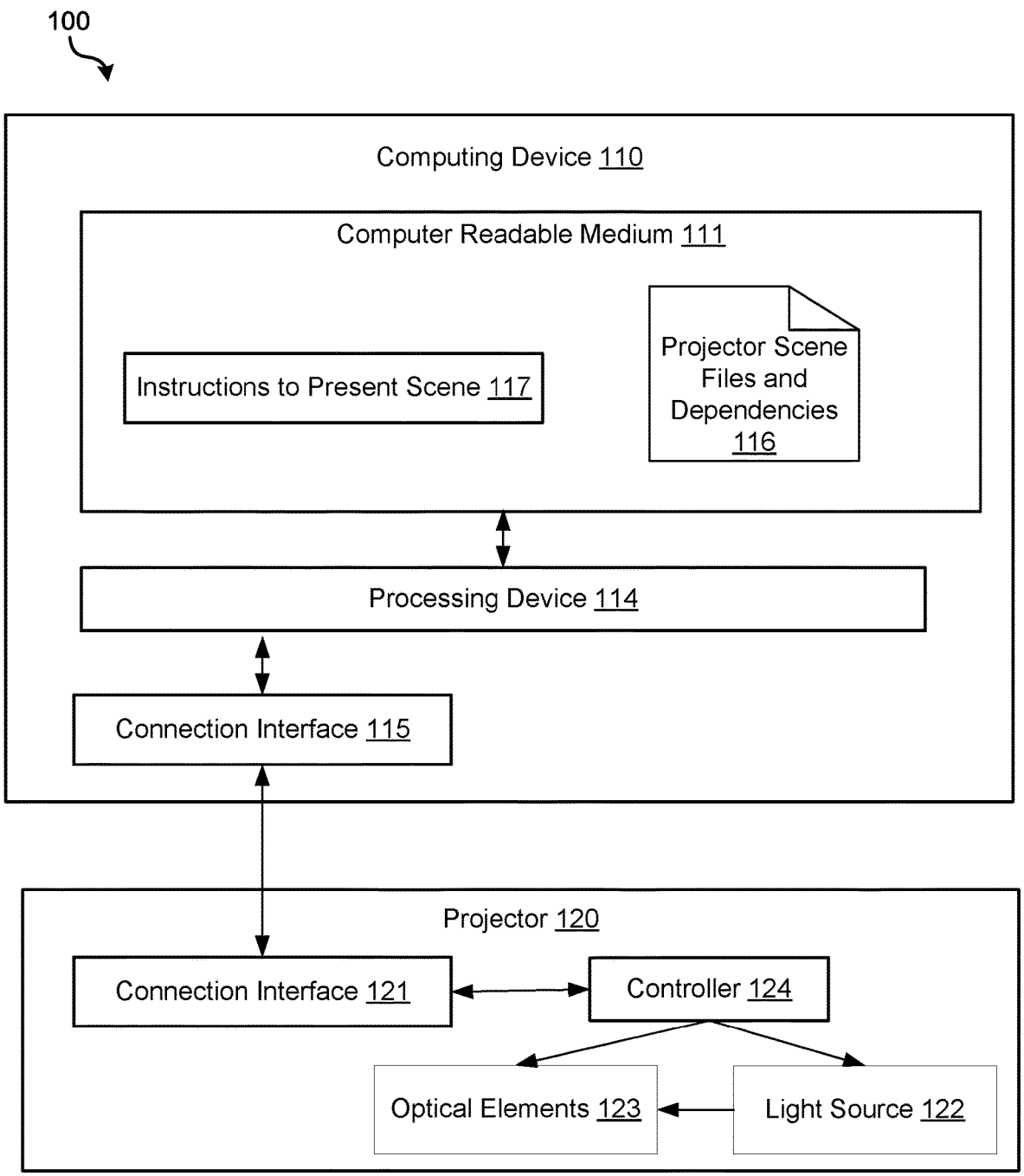
FIG. 2 is a block diagram illustrating an example architecture of components of a projector display system, in accordance with implementations of the disclosure.

FIG. 2 is a block diagram illustrating an example architecture of components of a projector display system 100, in accordance with implementations of the disclosure. In this example, a projector 120 communicatively coupled to computing device 110 is configured to receive a display signal that causes it to create a shadow during a MR experience. In other implementations, one or more components of computing device 110 (e.g., computer readable medium 111) may be directly integrated into projector 120 such that projector 120 determines what shadow to create.

Computing device 110 includes a computer readable medium 111, a processing device 114, and a connection interface 115. Computer readable medium 111 may store projector scene file(s) and dependencies 116 corresponding to a virtual world or "scene." As further described below, the virtual environment of the scene may correspond to a three-dimensional representation of the real-world environment in which the MR experience is presented. The scene may have a floor or other virtual surface, one or more stationary or moving virtual objects, and lighting that causes the virtual objects to cast a shadow on the floor or other surface. In the case of the scene displayed by the projector, the scene files and dependencies may be configured such that the floor and associated lighting (or other surface on which shadow is created), but not the virtual objects, are present.

Additionally, computer readable medium 111 may store instructions 117 that are executable by processing device 114 to present the scene (e.g., after loading scene files and dependencies 116 into memory). Prior to scene presentation, the scene may be aligned with the real-world such that the position of the projector corresponds to the position of the light source in the virtual world.

Connection interface 115 may be to communicatively couple computing device 110 to projector 120 through the projector's connection interface 121. For example, connection interface 115 may be to output a digital display signal to projector 120 that causes projector 120 to create a shadow (e.g., by projecting an image that lights certain areas of the floor) corresponding to a running scene. In some implementations, connection interface 115 and/or connection interface 121 may be implemented as an HDMI interface, a USB interface such as a USB Type-C interface, a THUNDERBOLT interface, or some other suitable interface. In other implementations, connection interface 115 and/or connection interface 121 may be implemented as a wireless interface.

Projector 120 may include a connection interface 121, a light source 122, optical elements 123 to modify and/or project light received from light source 123, and a controller 124. Projector 120 may be implemented as a single or multi chip DLP projector, an LCD projector, an LCoS projector, or any other projector including one or more light sources that may be used to project one or more images to create shadows corresponding to virtual objects.

Light source 122 may comprise one or more of an incandescent light source (e.g., an ultra-high pressure lamp), a light emitting diode (LED), a laser, or other suitable light source. Optical elements 123 may include intermediary optical elements to structure light emitted by the light source to create an image (e.g., a shadow). For example, intermediary optical elements may include: optical elements to route the light (e.g., mirrors), a digital micromirror device (DMD) chip comprising a matrix (e.g., microarray) of moveable mirrors to reflect light, transmissive LCD panels or displays, reflective LCoS microdevices (e.g., liquid crystal layer between thin-film transistor and silicon semiconductor), or other elements. Additionally, optical elements 123 may include a projection lens to collect and focus light from intermediary optical elements to project a desired image on a surface (e.g., to project a shadow on the floor).

Controller 124 may be to control light source 122 and/or optical elements 123. It may comprise circuitry for decoding a digital source signal (e.g., a digital video received through connection interface 121), and/or circuitry for controlling light source 122 and/or optical elements 123.

In some implementations, projector display system 100 may also include a network interface (not shown) such as an IEEE network interface card, a BLUETOOTH interface, an ETHERNET interface, or some other interface for communicating with other devices over a network. For example, the network interface may be to receive or send control signals for initializing and stopping scene playback (e.g., for synchronized scene playback with MR display system 200).

Figure 3:
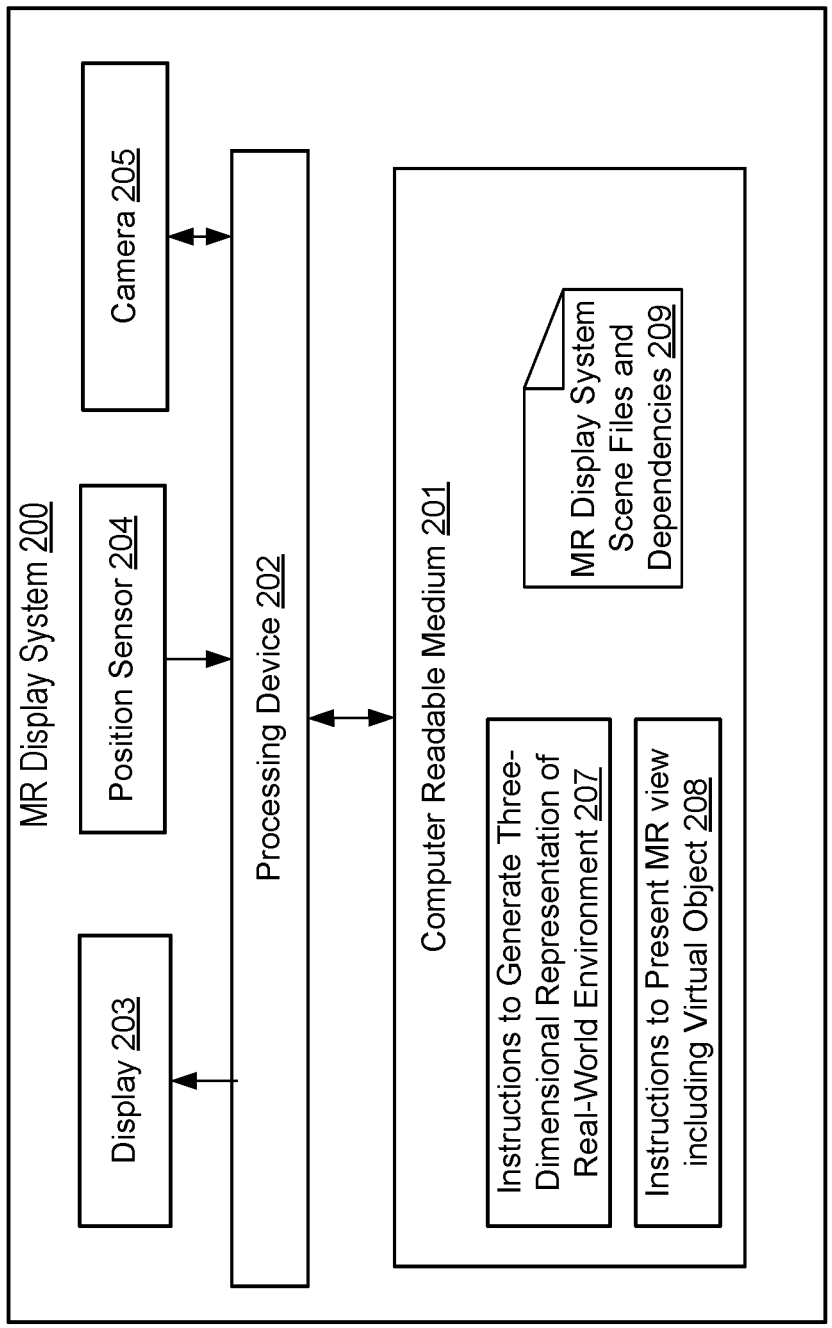
FIG. 3 is a block diagram illustrating an example architecture of components of an MR display system, in accordance with implementations of the disclosure.

FIG. 3 is a block diagram illustrating an example architecture of components of an MR display system 200, in accordance with implementations of the disclosure. MR display system 200 may be implemented as any MR display system that may present a MR view of the real-world, including an overlay of virtual objects. Although MR display system 200 is illustrated as a HMD tethered to a computing device in the example of FIG. 1, in other implementations it may be implemented using an untethered HMD, a smartphone, a tablet, a projector, and/or other suitable devices.

MR display system 200 may include a computer readable medium 201, processing device 202, display 203, position sensor 204, and camera 205. Display 203 may be a MR display such as an optical see-through display (e.g., a transparent OLED or LED screen that uses a waveguide to display the virtual objects overlaid over the real-world environment) or video see-through display that supplements video of the user's real world environment with overlaid virtual objects (e.g., overlay of video captured by camera 205 that is aligned with the FOV of the HMD).

Camera 205 may capture a video of the environment from the point of view of a wearer or holder of the MR display system 200. For instance, in the example of environment of FIG. 1A, the video may be captured from a camera integrated into the HMD.

Position sensor 204 may generate electronic signals representative of the position or motion of MR display system 200. These electronic input signals may be received and processed by circuitry of processing device 202 to determine the motion of a user of MR display system 200 and/or an absolute orientation of the displaying device (e.g., HMD) in the north-east-south-west (NESW) and up-down planes. In various embodiments, motion sensor 204 may include one or more gyroscopes, accelerometers, and/or magnetometers.

Computer readable medium 201 may store MR display system scene file(s) and dependencies 209 corresponding to the same scene as projector scene files and dependencies 116. As noted above, that scene may have a floor, one or more stationary or moving virtual objects, and lighting that causes the virtual objects to cast a shadow on the floor. In the case of the scene displayed by display 203, the scene files and dependencies may be configured such that the virtual object and its associated lighting, but not the floor (or other surface on which shadow is created) and associated lighting, are present. As further discussed below, by virtue of synchronously running two different versions of the same scene for playback by the project display system 100 and MR display system 200, presentation of the virtual object on display 203 may be synchronized with creation of the shadow in the real-world environment.

Additionally, computer readable medium 201 may store instructions 207, executable by processing device 202, to generate a three-dimensional representation of the real-world environment. Further, computer readable medium 201 may store instructions 208, executable by processing device 202, to present a MR view after loading scene files and dependencies 209 into memory. Prior to scene presentation, the scene may be aligned with the real-world such that the position of the display 203 (e.g., HMD) is the same as a display virtual camera in the virtual world.

In some implementations, MR display system 200 may also include a network interface (not shown) such as an IEEE network interface card, a BLUETOOTH interface, an ETHERNET interface, or some other interface for communicating with other devices over a network. For example, the network interface may be to receive or send control signals for initializing and stopping scene playback (e.g., for synchronized scene playback with projector display system 100).

Figure 4:
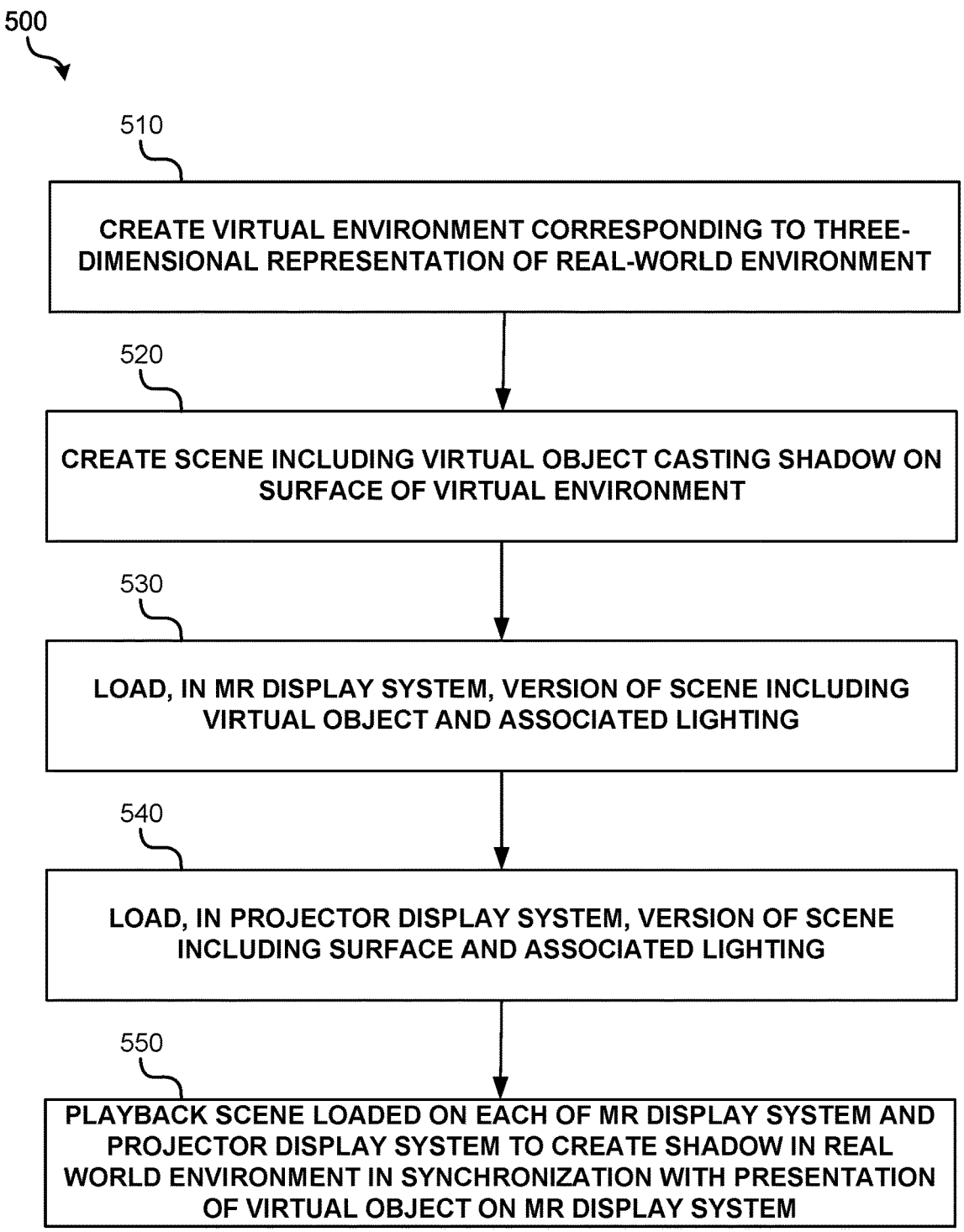
FIG. 4 is an operational flow diagram illustrating an example method that may be implemented to create and present a MR experience including created shadows, in accordance with implementations of the disclosure.

FIG. 4 is an operational flow diagram illustrating an example method 500 that may be implemented to create and present a MR experience including created shadows, in accordance with implementations of the disclosure. In some implementations, one or more operations of method 500 may be implemented by executing instructions stored on computer readable medium 111, computer readable medium 201, and/or some other computer readable medium.

At operation 510, a virtual environment corresponding to a three-dimensional representation of a real-world environment is created. In some implementations, the virtual environment may be created by scanning the real-world environment (e.g., using one or more cameras of an MR Display system 200 or some other device).

At operation 520, a scene may be created that includes a virtual object casting a shadow on a surface of the virtual environment. The created scene may include a set of one or more scene files and and/or dependencies. For example, depending on the virtual environment that was created from the real-world environment, the virtual object may cast a shadow on the floor, on a virtual object corresponding to a real-world object (e.g., table), on a wall, or on some other surface. The created scene may have the virtual object move around the virtual environment. For example, the scene may show a virtual character that casts a shadow and moves around the virtual environment. Additionally, the created scene may include a virtual lighting source that is to correspond to the position of the projector in the real world and a virtual camera that is to correspond to the position of the display (e.g., HMD) in the real world. In cases where there may be multiple projectors and/or multiple MR display users, the created scene may include multiple virtual lighting sources and/or multiple virtual cameras.

At operation 530, a version of the scene including the virtual object and associated lighting may be loaded into a memory of the MR display system. The virtual object may be integrated with needed real-world information to create a believably integrated MR object. For example, the virtual object may be integrated with static objects such as walls, fixtures, and tables, or with dynamic moving objects, by creating models of the real-world objects and registering them with the virtual world. As another example, real-world information may be integrated without models by using image-based techniques that do not require creating models of the real-world objects in advance.

At operation 540, a version of the scene including the surface(s) and their associated lighting may be loaded into a memory of the projector display system. In this case, the real-world information may be used to create believably integrated shadows, taking into account the color temperature and intensity of the environmental lighting. For example, the color temperature and intensity of the environmental lighting may be obtained using a photometer, a color temperature meter, an image sensor, and/or some other suitable sensor that is placed in the real-world environment. Color temperature and intensity of the environmental lighting may also be obtained from known specifications of the light sources used to illuminate the environment (e.g., lumen rating for fixed brightness light sources, lumen rating for different brightness levels for dimmable light sources, color temperature (fixed or adjustable), etc.) Other information that may be taken into account may include the size of the virtual object, the distance or orientation of the MR display system relative to the physical location at which the virtual object is to appear, etc.

At operation 550, the scene loaded onto each of the MR display system and projector display system may be played back in synchronization so as to create a shadow in the real world environment in synchronization with presentation of the virtual object on the MR display system. The MR display system may present an overlay of the virtual object over the real world. For example, the virtual object may be overlaid over a see-through video feed captured by the MR display system. A shadow corresponding to the virtual object may be created by the projector display system at a physical location at which the presented virtual object is to appear. The shadow may be created by the projector at that physical location based on the size of the virtual object, the location of the projector or other lighting sources, a color temperature of the physical environment, etc. This information may be determined in advance (e.g., prior to playback), and configured in the scene file that is presented by the projector.

In implementations, each version of the scene may be presented by running an instance of a scene renderer on each of the projector display system and MR display system. For example, an instance of a game engine renderer may be run on both the projector display system and MR display system to render their respective scene files.

Figure 5:
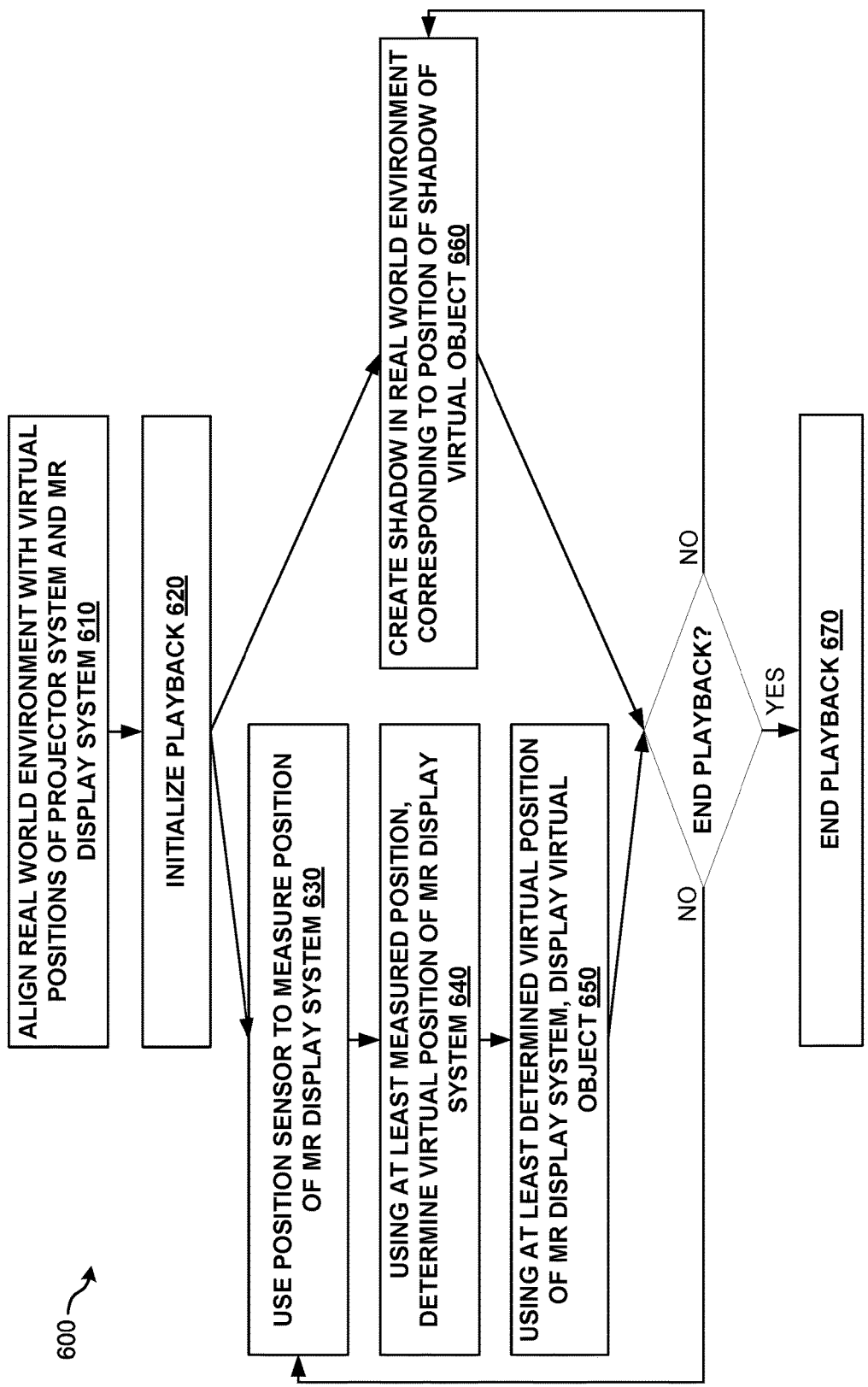
FIG. 5 is an operational flow diagram illustrating an example method that may be implemented to synchronously playback a scene that is loaded onto each of an MR display system and projector display system to present a virtual object with a created shadow, in accordance with implementations of the disclosure.

FIG. 5 is an operational flow diagram illustrating an example method 600 that may be implemented to synchronously playback a scene that is loaded onto each of the MR display system and projector display system to present an MR experience, in accordance with implementations of the disclosure.

At operation 610, prior to initializing playback, the real-world environment may be aligned with the virtual positions of the projector display system (e.g., position of virtual light source corresponding to projector) and MR display system (e.g., position of virtual camera corresponding to HMD). In particular, the two locations of the scenes may be corresponded such that the position of virtual objects is the same in both the projector's frame of reference and the MR display's frame of reference.

At operation 620, playback of the scene on each of the projector display system 100 and MR display system 200 may be initialized. In some implementations, playback may be synchronized between the two systems using one or more mechanisms. For instance, in implementations where the two systems can communicate (e.g., wirelessly) synchronization signals including clock information and/or triggers may be utilized. In some implementations, an audio signal or hidden visual cue (e.g., infrared or ultraviolet) may be used to synchronize playback. For example, at least one of the projector display system and MR display system may be equipped with an infrared optical receiver that causes playback to be initialized upon detecting an optical beam that is modulated with a start signal. As another example, at least one of the projector display system and MR display system may be configured with an ultrasonic receiver that causes playback to be initialized upon detecting an ultrasonic carrier wave modulated with a particular audio signal. In some implementations, one of the projector display system or MR display system is configured to generate the audio signal or hidden visual cue. In other implementations, some other device is configured to generate an audio signal or hidden visual cue.

During playback, MR display system 200 may iteratively perform a set of operations to update the position of a virtual object that is presented as a real world overlay on the display. At operation 630, a position sensor of the MR display system 200 may measure its current position. For example, its current position may be measured relative to its initial position when scene playback was initialized or as an absolute position in the real-world environment. At operation 640, using at least the measured position, a virtual position of the MR display system 200 (e.g., HMD) may be determined or updated. Using the updated virtual position, at operation 650, the display of the virtual object 650 relative to the real-world may be updated. In implementations where the virtual object 650 moves, the new position of the virtual objection 650 may also be taken into account. Operations 630-650 may be iteratively repeated using MR display system 200 until playback ends (operation 670). In addition to determining the position During playback, projector display system 100 may iteratively (e.g., at the projector's display frame rate) perform the operation 660 of creating a shadow in the real world environment corresponding to a position of the shadow of the virtual object. For example, an image of the shadow may be projected based on the scene that is played by the projector. Over time, as the virtual object changes its orientation or position, the image of the shadow may change.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
loading, in a memory of a mixed reality display system, one or more first scene files of a scene, the one or more first scene files comprising data for a virtual object;
loading, in a memory of a projector display system, one or more second scene files of the scene, the one or more second scene files comprising data for a virtual surface associated with a shadow of the virtual object; and
after loading the one or more first scene files and the one or more second scene files, synchronously:
displaying, at the mixed reality display system, based on the one or more first scene files, the virtual object overlaid over a view of a physical environment; and
projecting, using a projector of the projector display system, based on the one or more second scene files, a projection corresponding to the shadow on a surface in the physical environment.

2. The method of claim 1, further comprising: prior to synchronously displaying the virtual object and projecting the projection, aligning virtual positions of the projector display system and the mixed reality display system in a virtual world with actual positions of the projector display system and mixed reality display system in the physical environment.

3. The method of claim 1, wherein synchronously displaying the virtual object and projecting the projection, comprises: synchronously initializing presentation of the one or more first scene files loaded in the memory of the mixed reality display system and the one or more second scene files loaded in the memory of the projector display system.

4. The method of claim 3, wherein synchronously initializing presentation of the one or more first scene files loaded in the memory of the mixed reality display system and the one or more second scene files loaded in the memory of the projector display system, comprises: identifying an audio or hidden visual cue at one or both of the mixed reality display system and the projector display system.

5. The method of claim 1, wherein projecting the projection, comprises: projecting the projection based on the intensity and location of light sources in the physical environment.

6. The method of claim 1, wherein synchronously displaying the virtual object and projecting the projection, comprises:
synchronously running:
a first instance of a scene renderer on the mixed reality display system to render the one or more first scene files; and
a second instance of the scene renderer on the projector display system to render the one or more second scene files.

7. The method of claim 1, further comprising: creating the scene, wherein creating the scene comprises creating a virtual environment corresponding to a three dimensional representation of the physical environment.

8. The method of claim 1, wherein the surface of the physical environment is a first surface, wherein the projector is mounted to a second surface in the physical environment that is above a head mounted display of the mixed reality display system, wherein at least a portion of the first surface of the physical environment is the ground, wherein the head mounted display displays the virtual object overlaid over the real world environment.

9. The method of claim 8, wherein during presentation of the virtual object, the virtual object moves, wherein the method further comprises: shifting a position of the projection projected by the projector in accordance with the virtual object's movement.

10. A system, comprising:
a mixed reality display system comprising a display and a memory, the mixed reality display system configured to:
load, in the memory of the mixed reality display system, one or more first scene files of a scene, the one or more first scene files comprising data for a virtual object;
display, on the display, based on the one or more first scene files, the virtual object overlaid over a view of a physical environment; and
a projector display system comprising a memory and a projector, the projector display system configured to:
load, in the memory of the projector display system, one or more second scene files of the scene, the one or more second scene files comprising data for a virtual surface associated with a shadow of the virtual object; and
project, using the projector, based on the one or more second scene files, a projection corresponding to the shadow on a surface in the physical environment, wherein the mixed reality display system and the projector display system are configured to synchronously display the virtual object and project the projection corresponding to the shadow.

11. The system of claim 10, wherein during presentation of the virtual object, the virtual object moves, wherein the projector display system is configured to shift a position of the projection projected by the projector in accordance with the virtual object's movement.

12. The system of claim 10, wherein synchronously displaying the virtual object and projecting the projection, comprises: synchronously initializing presentation of the one or more first scene files loaded in the memory of the mixed reality display system and the one or more second scene files loaded in the memory of the projector display system by: identifying an audio or hidden visual cue at one or both of the mixed reality display system and the projector display system.

13. The system of claim 10, wherein the display is a display of a head-mounted display.

14. The system of claim 13, wherein the mixed reality display system comprises a position sensor to measure a position of the display during synchronous presentation of the virtual object and the projection.

15. One or more non-transitory computer readable mediums storing instructions executable by one or more processors, wherein execution of the instructions cause the one or more processors to perform operations comprising:
loading, in a memory of a mixed reality display system, one or more first scene files of a scene, the one or more first scene files comprising data for a virtual object;
loading, in a memory of a projector display system, one or more second scene files of the scene, the one or more second scene files comprising data for a virtual surface associated with a shadow of the virtual object; and
after loading the one or more first scene files and the one or more second scene files, synchronously:
displaying, at the mixed reality display system, based on the one or more first scene files, the virtual object overlaid over a view of a physical environment; and
projecting, using a projector of the projector display system, based on the one or more second scene files, a projection corresponding to the shadow on a surface in the physical environment.

16. The non-transitory computer readable medium of claim 15, wherein synchronously displaying the virtual object and projecting the projection, comprises:
synchronously initializing presentation of the one or more first scene files loaded in the memory of the mixed reality display system and the one or more second scene files loaded in the memory of the projector display system.

17. The non-transitory computer readable medium of claim 16, wherein during presentation of the virtual object, the virtual object moves, wherein the operations further comprise: shifting a position of the projection projected by the projector in accordance with the virtual object's movement.

* * * * *